US012749990B2

(12) United States Patent
Windgassen et al.

(10) Patent No.: US 12,749,990 B2
(45) Date of Patent: Sep. 29, 2026

(54) AC POWER TRANSFER OVER SELF-PASSIVATING CONNECTORS

(71) Applicant: Northrop Grumman Systems Corporation, Falls Church, VA (US)

(72) Inventors: James R. Windgassen, Chester, MD (US); Harvey P. Hack, Arnold, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 25 days.

(21) Appl. No.: 18/757,707

(22) Filed: Jun. 28, 2024

(65) Prior Publication Data

US 2024/0429835 A1 Dec. 26, 2024

Related U.S. Application Data

(63) Continuation of application No. 17/164,054, filed on Feb. 1, 2021, now Pat. No. 12,051,984, which is a continuation of application No. 16/200,147, filed on Nov. 26, 2018, now Pat. No. 11,005,390.

(51) Int. Cl.

| | |
|---|---|
| ***H02M 7/5387*** | (2007.01) |
| ***H01R 13/03*** | (2006.01) |
| ***H01R 43/00*** | (2006.01) |
| ***H02M 7/06*** | (2006.01) |

(52) U.S. Cl.

CPC .......... *H02M 7/5387* (2013.01); *H01R 13/03* (2013.01); *H02M 7/06* (2013.01); *H01R 43/005* (2013.01)

(58) Field of Classification Search

None

See application file for complete search history.

(56) References Cited

U.S. PATENT DOCUMENTS

| | | | |
|---|---|---|---|
| 3,751,296 | A | 8/1973 | Beer |
| 5,236,789 | A | 8/1993 | Cowie et al. |
| 5,602,463 | A | 2/1997 | Bendall et al. |
| 7,966,070 | B2 | 6/2011 | Taylor et al. |
| 9,893,460 | B2 | 2/2018 | Windgassen et al. |
| 2003/0102720 | A1 | 6/2003 | Baggs et al. |
| 2003/0219622 | A1 | 11/2003 | Niebauer |
| 2007/0260282 | A1 | 11/2007 | Taylor et al. |
| 2009/0257259 | A1 | 10/2009 | Leibovitz |
| 2012/0267955 | A1 | 10/2012 | Zhan et al. |

(Continued)

FOREIGN PATENT DOCUMENTS

| | | | |
|---|---|---|---|
| EP | 1316672 | A1 | 6/2003 |
| EP | 2293407 | A1 | 3/2011 |

OTHER PUBLICATIONS

Lemmon, What is a Rectifier Circuit?, 2009.
No Author Named, Bridge Rectifier Circuit, 2020.

*Primary Examiner* — Menatoallah Youssef
*Assistant Examiner* — Aqeel H Bukhari
(74) *Attorney, Agent, or Firm* — Dority & Manning, P.A.

(57) ABSTRACT

Methods and systems to transform an alternating current into constant-polarity constant or pulsed voltages, provide these to a first group of contacts of an electrical connector assembly such that none of the contacts is subjected to polarity reversal, receive the constant-polarity constant or pulsed voltages from a second group of contacts of the electrical connector assembly, and reconstruct the alternating current from these voltages.

18 Claims, 5 Drawing Sheets

(56) References Cited

U.S. PATENT DOCUMENTS

| | | | | |
|---|---|---|---|---|
| 2014/0268898 | A1* | 9/2014 | Zimmanck | H02M 3/33573 363/17 |
| 2014/0327314 | A1* | 11/2014 | Gerhardinger | H10F 77/955 307/77 |
| 2015/0011107 | A1 | 1/2015 | Hack | |
| 2016/0126858 | A1* | 5/2016 | Wu | H02M 1/126 363/89 |
| 2016/0134118 | A1 | 5/2016 | Broussard et al. | |
| 2016/0233607 | A1* | 8/2016 | Windgassen | H01R 13/523 |
| 2017/0126008 | A1 | 5/2017 | Shen et al. | |
| 2019/0296650 | A1 | 9/2019 | Wang et al. | |

* cited by examiner

AC POWER TRANSFER OVER SELF-PASSIVATING CONNECTORS

CROSS-REFERENCE TO RELATED APPLICATIONS

The present application is a continuation of U.S. application Ser. No. 17/164,054 having a filing date of Feb. 1, 2021, which is a continuation of U.S. application Ser. No. 16/200,147, filed Nov. 26, 2018, entitled "AC Power Transfer over Self-Passivating Connectors," the contents of which are hereby incorporated by reference in their entirety.

FIELD OF INVENTION

The present invention relates to systems and methods for providing alternating current through electrical connectors with self-passivating contacts where such contacts cannot tolerate polarity reversal.

BACKGROUND

An electrical connector assembly may include electrical contacts made from a self-passivating transition metal, which forms a non-conductive passivation layer on surfaces of the positive contact when the contact is exposed to water or other electrolytes. This non-conductive passivation layer minimizes current leakage from the contact into the electrolyte and/or prevents short circuits across the contacts.

It has been found that, for some contacts made from a self-passivating transition metal, passivation response is slow enough that they will not have sufficient time to form an effective insulating film when the polarity of the contacts reverses too quickly, for example, when applying alternating current of sufficiently high frequency. For this reason, such contacts have been found unsuitable for use in applications in which there is a rapid polarity reversal of the contacts. This same reasoning is why polarity cannot be reversed on tantalum and electrolytic capacitors.

SUMMARY

Disclosed herein are methods and systems for providing alternating current through an electrical connector assembly or other device that includes electrical contacts which cannot tolerate rapid polarity reversal, such as those made at least in part from a self-passivating metal which forms a non-conductive passivation layer on surfaces of the contacts when the contact is exposed to water or other electrolyte. Example methods and systems disclosed herein transform the alternating current into a constant-polarity constant or pulsed voltage signal, and provide the voltage signal to a first group of contacts of an electrical connector assembly such that none of the self-insulating contacts is subjected to alternating polarity. The constant or pulsed voltage signal is then transformed back into alternating current on the other side of the contacts. As a result, contacts that have heretofore been unsuitable for use in applications in which there is a rapid polarity reversal of the contacts may be used to provide an alternating current to a load.

In accordance with a first aspect, a system for providing an alternating current (AC) over a plurality electrical contacts, wherein one or more of the electrical contacts cannot tolerate polarity reversal, is provided. The system comprises an AC source, and an AC deconstruction circuit configured to receive an alternating current from the AC source, transform the alternating current from the AC source into a constant-polarity voltage signal, and provide the constant-polarity voltage signal to the electrical contacts such that none of the electrical contacts is subjected to a polarity reversal. The system may further comprise an AC reconstruction circuit configured to receive the constant-polarity voltage signal from the electrical contacts, and to reconstruct the alternating current from the constant-polarity voltage signal. In an embodiment, the system includes first and second groups of electrical contacts, wherein one or more of the electrical contacts in each of the first and second groups cannot tolerate a polarity reversal, and the AC deconstruction circuit is configured to transform the alternating current into first and second constant-polarity pulsed voltage signals that are provided to respective first and second groups of electrical contacts. In an embodiment, the AC reconstruction circuit includes switch circuits and a control circuit configured to control the switch circuits to alternately reverse the connections between first and second nodes of a load based on a signal amplitude at a first contact of the electrical contacts, to reconstruct the alternating current signal across the load.

In an embodiment, the electrical contacts of the system may be part of an electrical connector assembly disposed between the AC deconstruction circuit and the AC reconstruction circuit. In an embodiment, one or more of the electrical contacts on each side of the connector assembly may be made from or coated with a self-passivating metal.

In accordance with a second aspect, a method for providing an alternating current (AC) over a plurality of electrical contacts, wherein one or more of the electrical contacts cannot tolerate polarity reversal, is provided. The method comprises the steps of transforming an alternating current into a constant-polarity voltage signal, and providing the constant-polarity voltage signal to the electrical contacts such that none of the electrical contacts is subjected to a polarity reversal. The method may further comprise the steps of receiving the constant-polarity voltage signal via the electrical contacts, and reconstructing the alternating current from the constant-polarity voltage signal received via the electrical contacts. In an embodiment, the step of transforming an alternating current into a constant-polarity voltage signal includes transforming the alternating current into first and second constant-polarity pulsed voltage signals, providing the first constant-polarity pulsed voltage signal to a first group of the electrical contacts, and providing the second constant-polarity pulsed voltage signal to a second group of the electrical contacts. In an embodiment, the reconstructing step includes controlling switch circuits to alternately reverse the connections between first and second nodes of a load based on a signal amplitude at a first contact of the electrical contacts, to reconstruct the alternating current signal across the load.

In an embodiment, the electrical contacts include a first group of self-passivating electrical contacts and a second group of self-passivating electrical contacts configured to mate with the first group, and the method further comprises the steps of mating the first group of self-passivating electrical contacts with the second group of self-passivating electrical contacts, and positioning the first and second groups of self-passivating electrical contacts in an electrolytic environment.

BRIEF DESCRIPTION OF THE DRAWINGS

Example embodiments of the invention are described below with reference to the following drawing figures, in which like reference numerals are utilized to designate like components.

DETAILED DESCRIPTION

Figure 1:
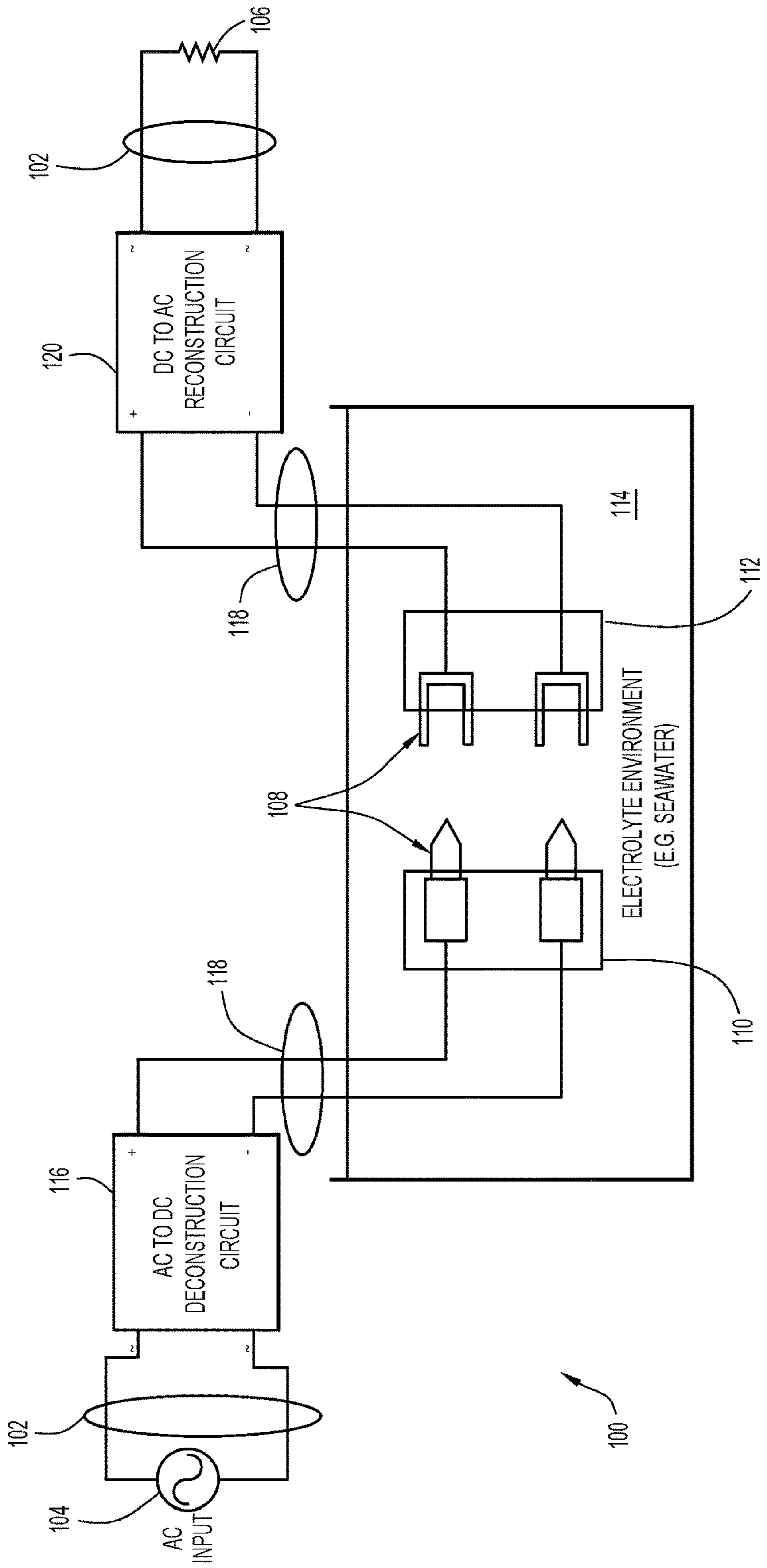
FIG. 1 is a block diagram illustrating an example embodiment of a system for converting an alternating current to a constant-polarity voltage signal for application across a plurality of contacts such that the contacts are not subjected to polarity reversal, and then reconstructing the alternating current.

FIG. 1 is a diagram of an apparatus 100 for providing an alternating current (AC) 102 from an AC source 104 to a load 106 across a plurality of contacts 108 such that the contacts are not subjected to polarity reversal normally associated with AC. In the example embodiment shown, the contacts 108 are part of an electrical connector assembly that includes mating connectors 110 and 112. One or more of the contacts 108 may be self-insulating contacts to reduce or preclude current leakage in an ionically conductive (electrolyte) environment 114. Examples of an electrolytic environment 114 include, without limitation, water having sufficient mineral content to support leakage current flow (e.g., salt water, seawater, well water, lake water, and/or river water) and other types of electrolytes. The self-insulating contacts of the electrical connector assembly shown in the example embodiment may be formed of or coated with a self-passivating transition metal. The self-passivating transition metal may include, without limitation, niobium (Nb), tantalum (Ta), titanium, zirconium, molybdenum, ruthenium, rhodium, palladium, hafnium, tungsten, rhenium, osmium, iridium, and/or combinations or alloys thereof. When wetted, a non-conductive passivation layer forms on contacts formed of or coated with a self-passivating transition metal.

Figure 3:
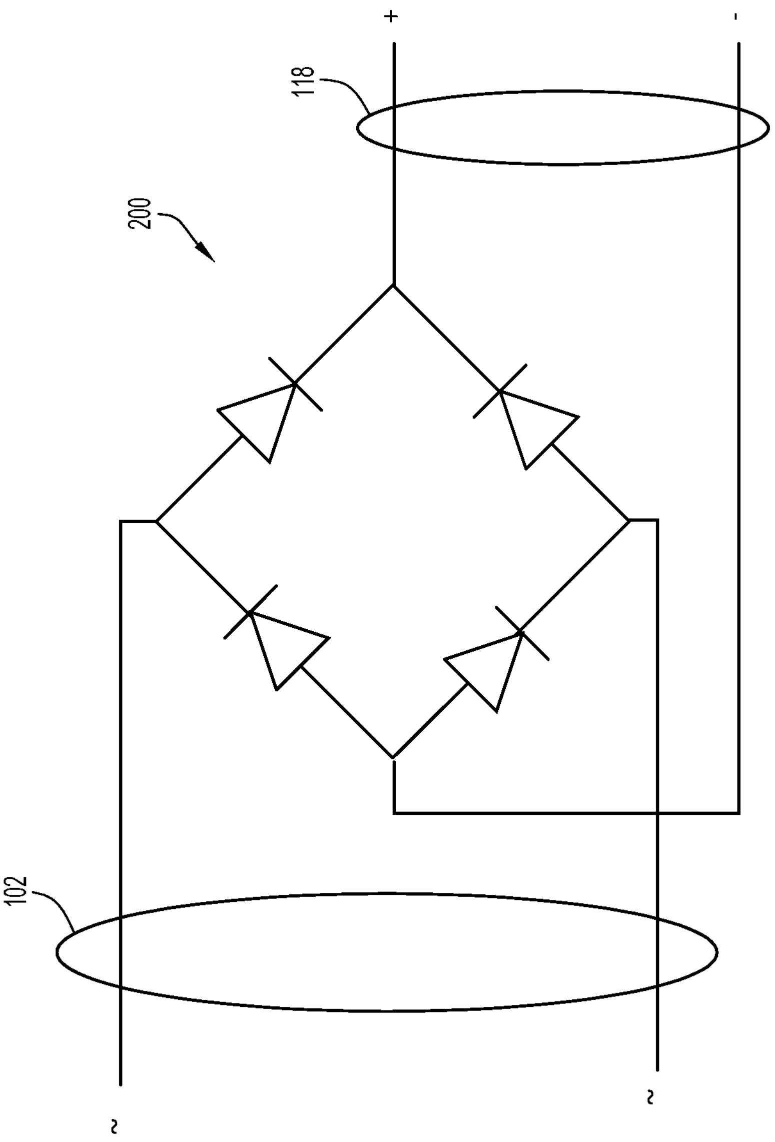
FIG. 3 is a schematic diagram of an example full wave bridge rectifier that may be used to convert an alternating current to a pulsed constant-polarity DC voltage signal in the embodiment shown in FIG. 2.
Figure 4:
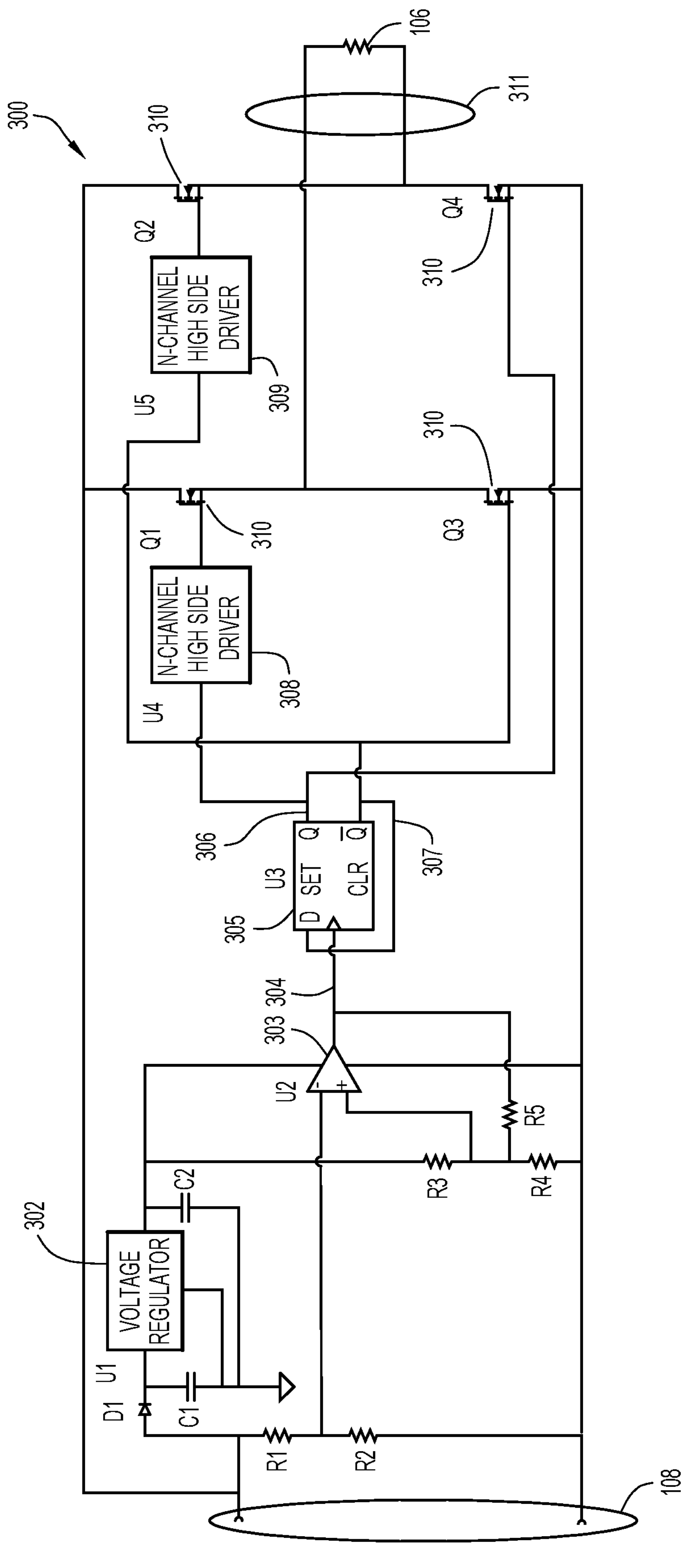
FIG. 4 is a schematic diagram of an example pulsed DC to AC reconstruction circuit that may be used to convert a pulsed DC constant-polarity voltage signal back to an original alternating current in the embodiment shown in FIG. 2.

The apparatus 100 shown in FIG. 1 may be useful, for example, to transfer AC power (i.e., a relatively high frequency alternating current) from AC source 104 to load 106 via contacts 108 that are disposed in an electrolytic environment 114, without causing polarity reversal of the contacts. This is particularly advantageous if one or more of the contacts are formed of or coated with a self-passivating transition metal, because it has been found that the non-conductive passivation layers on the contacts may be disrupted by current or voltage reversals. Thus, the apparatus 100 in FIG. 1 includes an AC to direct current (DC) deconstruction circuit 116 that deconstructs or transforms alternating current 102 into constant or pulsating constant-polarity current or voltage 118, such that none of the contacts of the electrical connector assembly is subjected to reversal in polarity. The AC to DC deconstruction circuit 116 may include, for example, a full wave bridge rectifier (see, e.g., FIGS. 2 & 3 at 200), a full wave rectifier, or an AC-DC power supply. The apparatus in FIG. 1 further includes a DC to AC reconstruction circuit 120 that receives the constant-polarity voltages current or voltage 118 over contacts 108 of the electrical connector assembly (110, 112) and reconstructs the AC signal 102. An example embodiment of a DC to AC reconstruction circuit 120 is shown in FIGS. 2 & 4 at 300.

Figure 2:
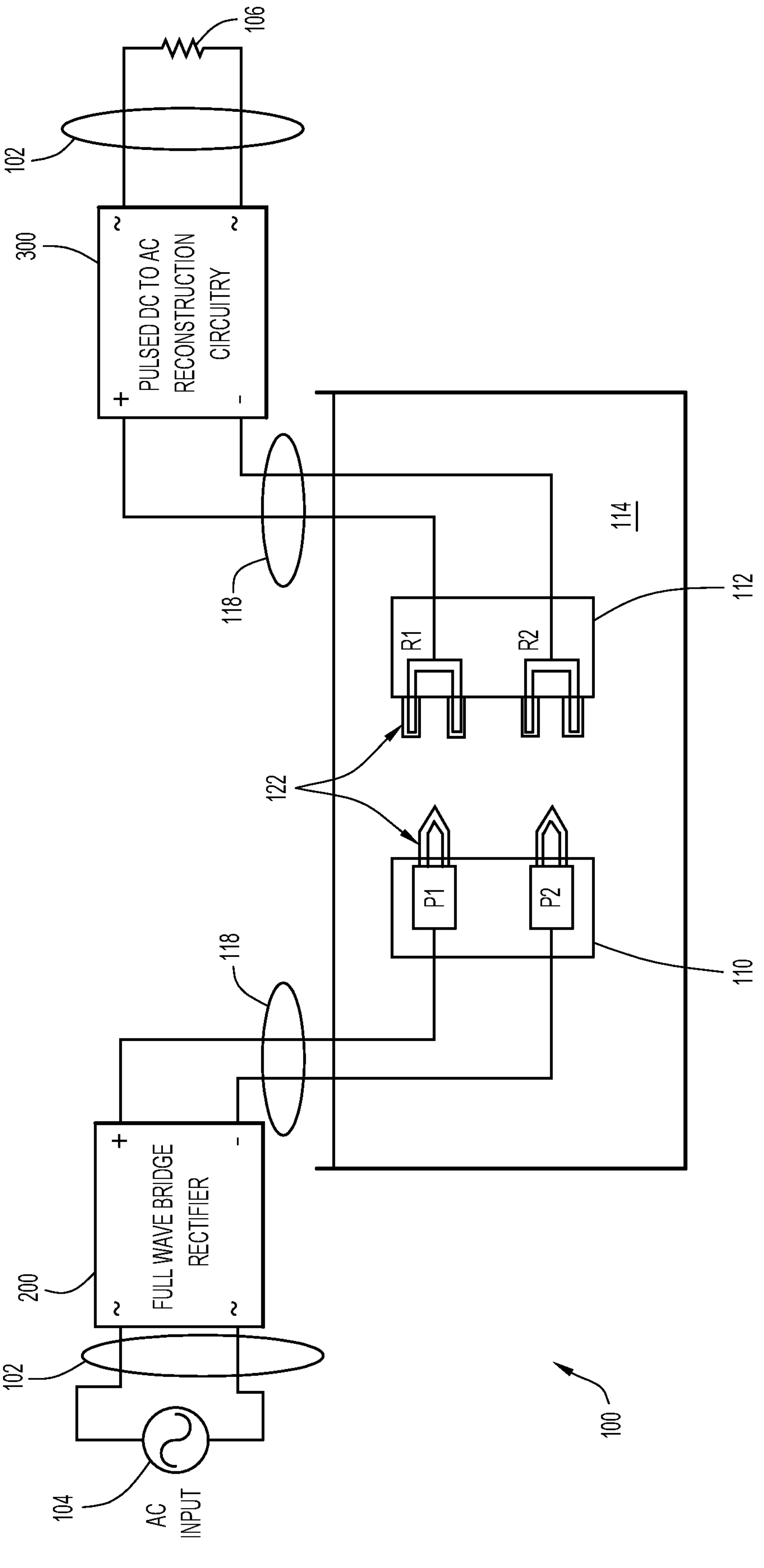
FIG. 2 is a block diagram illustrating another example embodiment of a system for converting an alternating current to a constant-polarity voltage signal for application across a plurality of contacts such that the contacts are not subjected to polarity reversal, and then reconstructing the alternating current contact.

In the example embodiments shown in FIGS. 1 and 2, each of the connectors 110 and 112 includes a plurality of electrical contacts configured to mate with contacts on the other connector. For example, in FIG. 2, electrical connector 110 includes a first group of contacts P1 and P2, and electrical connector 112 includes a second group of contacts R1 and R2 contact. Contacts P1 and P2 are illustrated as male type components (e.g., pins), and contacts R1 and R2 are illustrated as female type components (e.g., receptacles or sockets). It will be appreciated that more than two pins and two receptacles may be needed for some embodiments to prevent polarity reversal. Contacts P1 and P2 may be mated with respective contacts R1 and R2 by physically positioning or inserting contacts P1 and P2 into respective contacts R1 and R2. Contacts P1, P2, R1, and R2 are not, however, limited to pins and receptacles.

Contacts P1 and R1 may be formed from or coated with a self-passivating metal to form non-conductive passivation layers 122 on the metal surfaces thereof when immersed in an electrolytic environment 114. In addition, contacts P2 and R2 may optionally be formed from or coated with a self-passivating metal to form non-conductive passivation layers when wetted.

When contacts P1 and P2 are physically mated with respective contacts R1 and R2, portions of the respective passivation layers 122 are disrupted (e.g., tom or scraped away), to provide a low resistance electrical connection between the respective contacts. Disconnecting contacts P1 and P2 from respective contacts R1 and R2 exposes the disrupted portions of the surfaces to environment 114. The exposure causes the disrupted portions of the surfaces of the contacts to re-grow the passivation layers to re-insulate the contacts from environment 114.

This may reduce or preclude current leakage into environment 114.

As noted above, self-passivating layers 122 of contacts P1 and R1 (and optionally P2 and R2) may be disrupted by alternating current (i.e., polarity changes). In the embodiment shown in FIG. 2, the AC deconstruction circuit 116 is shown as a full wave bridge rectifier circuit 200 that transforms alternating current 102 into a pulsed constant-polarity DC voltage signal 118, such that none of the contacts P1, P2, R1, and R2 is subjected to polarity reversal. FIG. 3 shows an example full wave bridge rectifier circuit 200 in which four diodes are arranged in a bridge such that different pairs of diodes conduct current 102 to the positive contact during respective half cycles and thus output a pulsating DC voltage 118 of constant polarity.

The full wave bridge rectifier circuit 200 shown in FIGS. 2 and 3 is merely an example of an AC deconstruction circuit 116 that may be used in the present system. Other examples include, but are not limited to, an AC to DC power supply circuit, and a full wave rectifier circuit (e.g., a multiple winding transformer and two diodes connected to a center point of the secondary winding through a single load resistance, such that each diode takes turns conducting when its anode contact is positive with respect to the center point of the transformer). This circuit effectively doubles the frequency due to its full-wave rectification action.

FIG. 4 is a schematic diagram of an example circuit 300 that may be used as an AC reconstruction circuit 120 in the present system. Circuit 300 receives a pulsating DC voltage input via terminals 108 which was generated by an AC deconstruction circuit 116 (e.g., the full wave bridge rectifier 200 shown in FIG. 2). This voltage is filtered and regulated by a voltage regulator 302 and associated components to supply power to an operational amplifier comparator 303 which generates a signal output 304 when the pulsating DC voltage drops below a predefined value close to zero. This signal output is fed to a flip flop circuit 305 which alternately energizes Q 306 and Q' 307, dividing the input frequency from the comparator 303 by two to reconstruct the original input frequency 102. These signals travel through N-Channel high side drivers 308 and 309 to N-Channel MOSFET switches 310 which reverse the polarity of the current to output a reconstructed AC signal 311 that is essentially the same as the original AC signal 102 (e.g., having the same amplitude and frequency). This reconstructed signal 311 is then fed to the load 106.

Figure 5:
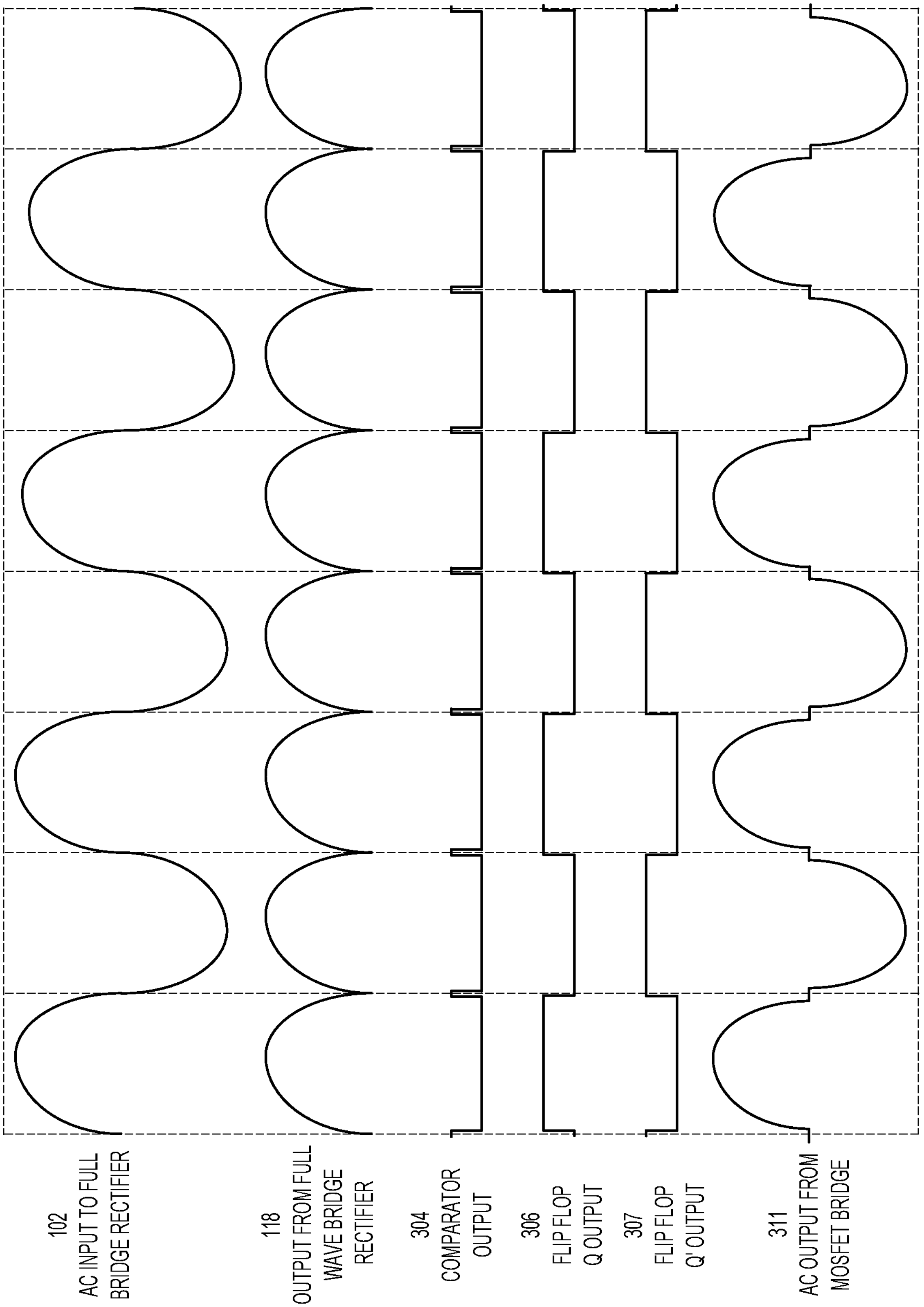
FIG. 5 is a timing diagram illustrating the electrical signals at various points in the system shown in FIGS. 2-4.

FIG. 5 is a signal timing diagram that shows: (a) an example AC input 102 to the full wave bridge rectifier 200 shown in FIGS. 2 and 3; (b) a pulsating DC output 118 from the full wave bridge rectifier 200 (which is of constant polarity); (c) an output pulse from the operational amplifier comparator 303 in the pulsating DC to AC reconstruction circuit 300 shown in FIG. 3 (which is generated whenever the voltage drops below a pre-determined value); (d) a signal generated on Q 306 (FIG. 4) if the output pulse from the operational amplifier comparator switches the state of flip flop 305 (FIG. 4) such that a signal is generated on Q; (e) a signal generated on Q' 307 (FIG. 4) if the output pulse from the operational amplifier comparator switches the state of flip flop 305 (FIG. 4) such that a signal is generated on Q' (but not both Q and Q' simultaneously); and (f) the reconstructed AC signal output 311 (which is approximately in phase with the original AC input 102 to the full wave bridge rectifier 200). Referring to FIG. 4, it is noted that the signals from Q and Q' travel through N-Channel high side driver 308 or 309 to activate two of four N-Channel MOSFET switches 310. These switches reverse the polarity of the pulsed DC input signal 118 to ultimately reconstruct the AC signal as output 311, which, as illustrated in FIG. 5, has the same frequency and amplitude as the original AC input 102, and is in phase with the original AC input 102.

As used herein, the term “includes” means “includes but not limited to”, and the term “including” means “including but not limited to.” The term “based on” means “based at least in part on.” Additionally, where the disclosure or claims recite “a,” “an,” “a first,” or “another” element, or the equivalent thereof, it should be interpreted to include one or more than one such element, neither requiring nor excluding two or more such elements.

It will be appreciated that the example embodiments described above and illustrated in the drawings represent only a few of the many ways of implementing the invention. Many modifications and variations will be apparent to those of ordinary skill in the art. The scope of the claims is not intended to be limited by any of the example embodiments disclosed herein. For example, while an example embodiment is shown for preventing self-passivating contacts of an electrical connector assembly from being subjected to polarity reversal, it will be appreciated that the system and method may be modified to prevent polarity reversal across other types of contacts that cannot tolerate polarity reversal. For example, the system and method may be utilized to prevent polarity reversal across contacts in the form of rails that use self-passivating materials in an electrolytic environment, or contacts made of tantalum, or contacts in other electrical components and applications in which polarity reversal across the contacts cannot be tolerated. While the connectors in the example embodiment are shown with two electrical contacts, it will be appreciated that each connector may have more than two electrical contacts. It will also be appreciated that all or fewer than all of the contacts may be of a type that cannot tolerate polarity reversal. Additionally, while the electrical contacts in the connectors are shown as pins and sockets, it will be appreciated that other types of male and female contacts may be used, as well as other types of electrical contacts. Furthermore, while example AC deconstruction and AC reconstruction circuits are described herein, it will be appreciated that other types of AC deconstruction and AC reconstruction circuits may be used. For example, instead of a full wave bridge rectifier, the AC deconstruction circuit may include a AC-DC power supply, or a full wave rectifier with a multiple winding transformer and two diodes connected to a center point of the secondary winding through a single load resistance, such that each diode takes turns conducting when its anode contact is positive with respect to the center point of the transformer. Also, it will be appreciated that methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

What is claimed is:

1. A system for providing an alternating current (AC) or voltage, the system comprising:

an electrical connector assembly configured to provide a constant-polarity voltage signal; and an AC reconstruction circuit configured to receive the constant-polarity voltage signal from the electric connector assembly and reconstruct from the constant-polarity voltage signal the alternating current as an output signal, the AC reconstruction circuit including one or more switch circuits and a control circuit configured to control the one or more switch circuits to alternately reverse connections between first and second nodes of a load based on a signal amplitude at the electrical connector assembly, wherein the AC reconstruction circuit comprises:

a voltage regulator configured to filter and regulate the constant-polarity voltage signal;

an operational amplifier comparator configured to generate a signal output;

a flip flop circuit configured to divide the signal output; and a switch circuit configured to reverse a polarity of the alternating current.

2. The system of claim 1, wherein:

the output signal has the same frequency and amplitude as an AC input received from an AC source and is in phase with the AC input from the AC source.

3. The system of claim 1, wherein:

the electrical connector assembly includes one or more electric contacts that are self-passivating in an electrolytic environment.

4. The system of claim 1, wherein:

the electrical connector assembly includes one or more electric contacts that are not subjected to polarity reversal.

5. The system of claim 1 further comprising:

an AC deconstruction circuit configured to receive an AC input from an AC source, transform the AC input from the AC source into the constant-polarity voltage signal, and provide the constant-polarity voltage signal to the electrical connector assembly.

6. The system of claim 1, wherein the electrical connector assembly comprises a first connector and a second connector;

the first connector comprises a first group of electrical contacts; and the second connector comprises a second group of electrical contacts, wherein the second group of electrical contacts is configured to mate with the first group of electrical contacts.

7. The system of claim 6, wherein the control circuit is configured to control the one or more switch circuits to alternately reverse connections between the first and the second nodes of the load based on the signal amplitude at the first group of electrical contacts of the first connector of the electrical connect assembly.

8. The system of claim 6, wherein the first connector is a male type connector and the second connector is a female type connector.

9. A method for providing an alternating current (AC) or voltage, the method comprising:

receiving a constant-polarity voltage signal at an electrical connector assembly;

providing the constant-polarity voltage signal to a reconstruction circuit via the electrical connector assembly; and reconstructing the alternating current from the constant-polarity voltage signal by controlling one or more switch circuits to alternately reverse connections between first and second nodes of a load based on a signal amplitude at the electrical connector assembly, wherein reconstructing the alternating current from the constant-polarity voltage signal, comprises:

filtering, by a voltage regulator, the constant-polarity voltage signal;

generating, by an operational amplifier comparator, a signal output;

dividing, by a flip flop circuit, the signal output; and reversing, by switch circuits, a polarity of the alternating current.

10. The method of claim 9, wherein the signal output has the same frequency and amplitude as an AC input received from an AC source and is in phase with the AC input from the AC source.

11. The method of claim 10, further comprising:

transforming the AC input from the AC source into the constant-polarity voltage signal.

12. The method of claim 9, wherein controlling the one or more switch circuits, comprises:

generating a pulse when the signal amplitude at a first contact of the electrical connector assembly is below a reference amplitude; and toggling states of the one or more switch circuits in response to the pulse.

13. A system for providing an alternating current (AC) or voltage through electrical connectors; the system comprising:

an electrical connector assembly configured to provide a constant-polarity voltage signal; and an AC reconstruction circuit configured to receive the constant-polarity voltage signal from the electrical connector assembly and reconstruct from the constant-polarity voltage signal the AC current as an output signal, wherein the output signal has the same frequency and amplitude as an AC input and is in phase with the AC input, wherein the AC reconstruction circuit comprises:

a voltage regulator configured to filter and regulate a constant-polarity voltage signal;

an operational amplifier comparator configured to generate a signal output;

a flip flop circuit configured to divide the signal output; and a switch circuit configured to reverse a polarity of the alternating current.

14. The system of claim 13, wherein:

the AC reconstruction circuit includes one or more switch circuits and a control circuit configured to control the one or more switch circuits to alternately reverse connections between first and second nodes of a load based on a signal amplitude at the electrical connector assembly.

15. The system of claim 13, wherein:

the electrical connector assembly includes one or more electric contacts that are self-passivating in an electrolytic environment.

16. The system of claim 13, wherein:

the electrical connector assembly includes one or more electric contacts that cannot tolerate polarity reversal.

17. The system of claim 13, further comprising:

an AC source; and an AC deconstruction circuit configured to receive the AC input from the AC source, the AC deconstruction circuit is configured to transform the AC input from the AC source into the constant-polarity voltage signal and provide the constant-polarity voltage signal to the electrical connector assembly.

18. A method for providing an alternating current (AC) or voltage, the method comprising:

receiving a constant-polarity voltage signal at an electrical connector assembly;

providing the constant-polarity voltage signal to a reconstruction circuit via the electrical connector assembly; and reconstructing from the constant-polarity voltage signal the alternating current as an output signal, wherein the output signal has the same frequency and amplitude as an AC input and is in phase with the AC input, wherein reconstructing from the constant-polarity voltage signal the alternating current, comprises:

filtering, by a voltage regulator, the constant-polarity voltage signal;

generating, by an operational amplifier comparator, a signal output;

dividing, by a flip flop circuit, the signal output; and reversing, by switch circuits, a polarity of the alternating current.

* * * * *